Feb. 22, 1966 W. H. KEITER 3,236,001
BAIT CONTAINER
Filed Jan. 17, 1962 2 Sheets-Sheet 1
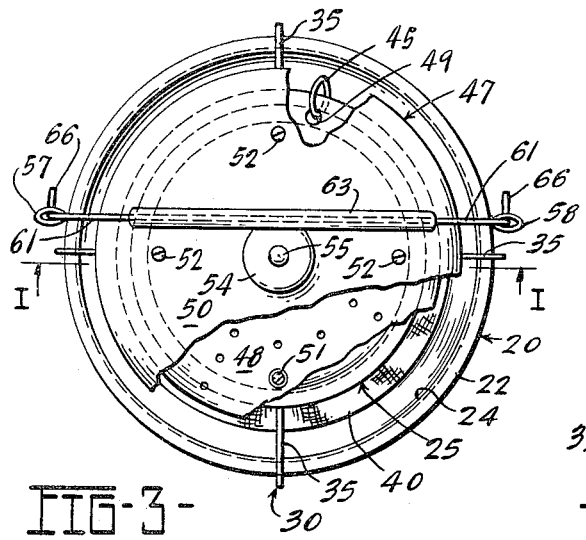
FIG-3-
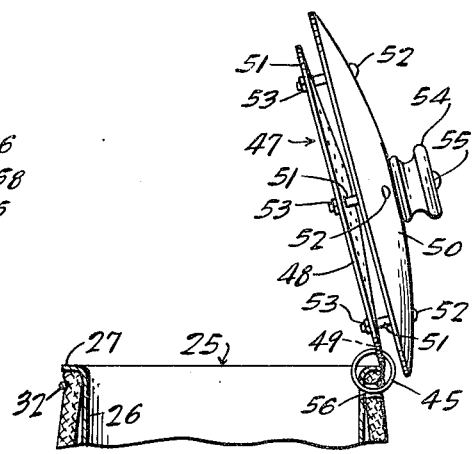
FIG-4-
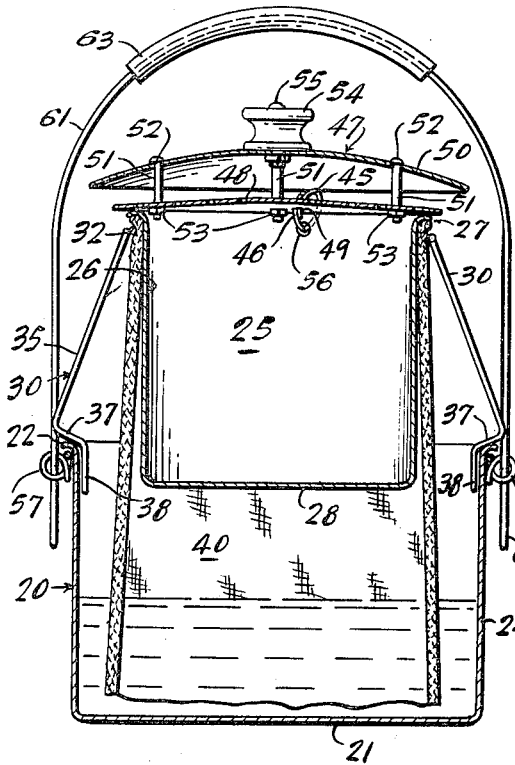
FIG-1-
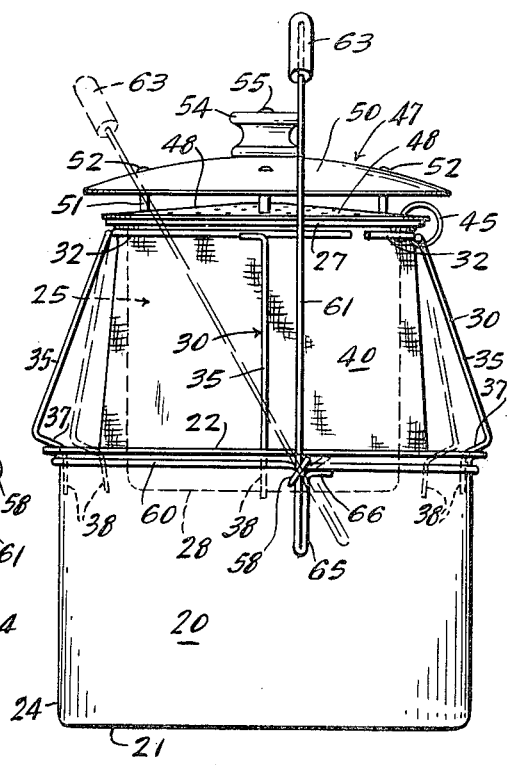
FIG-2-
INVENTOR:
WILLIAM H. KEITER.
BY
*Hugh A Kirk*
ATT'Y.

Feb. 22, 1966   W. H. KEITER   3,236,001
BAIT CONTAINER
Filed Jan. 17, 1962   2 Sheets-Sheet 2
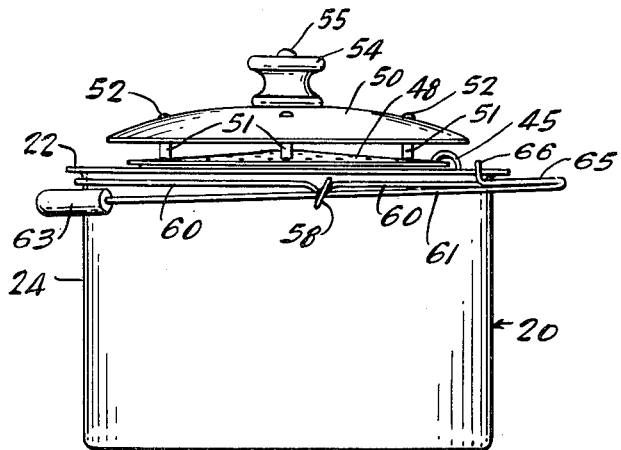
FIG-5-
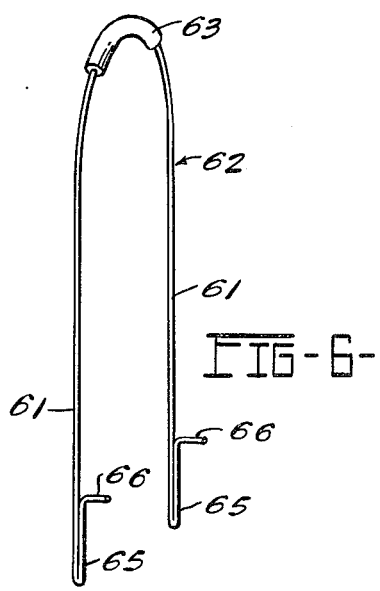
FIG-6-
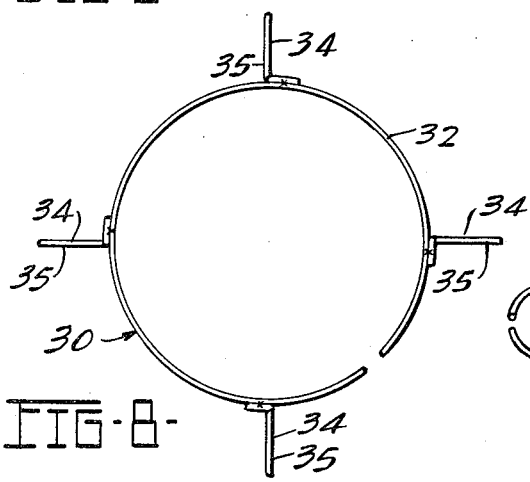
FIG-8-
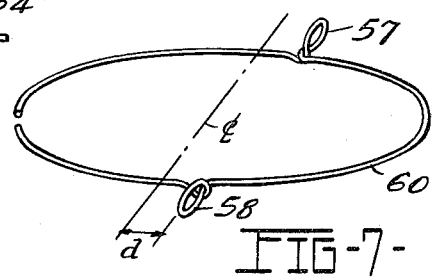
FIG-7-
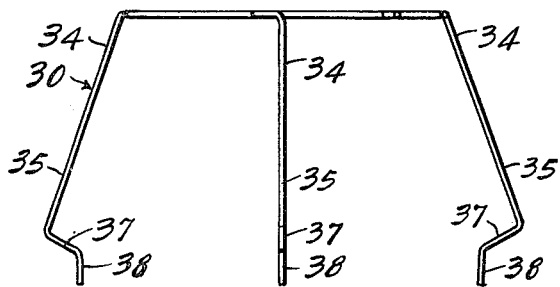
FIG-9-
INVENTOR:
WILLIAM H. KEITER.
BY
Hugh A. Kirk
ATT'Y.

United States Patent Office 3,236,001
Patented Feb. 22, 1966

3,236,001
BAIT CONTAINER
William H. Keiter, Toledo, Ohio; Edward F. Keiter, executor of said William H. Keiter, deceased, assignor to Edward F. Keiter, Robert W. Keiter, Janet K. Walker, Kathryn K. Shaffer, and Frederick B. Keiter
Filed Jan. 17, 1962, Ser. No. 166,753
12 Claims. (Cl. 43—55)

This invention relates to portable containers for bait and is particularly directed to a container or bucket in which live bait for fish, such as worms, may be stored and kept alive.

An object of the invention is to provide an improved fish bait container that is easily and economically fabricated yet highly efficient in which bait may be kept cool and therefore alive for a considerable length of time.

Another object of this invention is to provide a bait container in which moisture is evaporated to cool the container and thus maintain the bait at a reduced temperature.

Another object of the invention is to provide a bait container including an outer container and an inner receptacle or bait holder spaced from the outer container and surrounded with wick means moistened from a supply of evaporatable liquid in the outer container, the arrangement being such that evaporation of the moisture produces a cooling effect on the bait holder.

Another object of the invention is to provide inner and outer telescopically arranged receptacles or containers with means to position the inner container in an elevated position so that air currents may pass therearound.

Still another object is to provide a portable receptacle with a bail which receptacle is limited from tilting relative to the bail while being carried.

Generally speaking, the bait holder and cooler comprises an outer open ended container for a supply of evaporatable liquid such as water, an inner bait receptacle having its side walls spaced from the side walls of the container by collapsible supporting rack means including a ring embracing the receptacle and a plurality of resilient legs depending therefrom having releasable container rim engaging portions for supporting the receptacle in an elevated position so that a cylindrical wick embracing the side walls of the receptacle extends therebelow into the liquid in the container. A cover for the receptacle includes an inner perforated lid above which is vertically spaced an imperforate lid having a central handle or knob, the cover assembly being secured to the receptacle by a hinge or ring fastener to prevent unintentional detachment thereof. A carrying bail is attached to rigid loops associated with the container at one side of the diameter of said container, the bail being formed with offset latching portions which cooperate with the loops to prevent tipping of the device when the receptacle is elevated above the container which may cause the assembly to be top heavy.

The above mentioned and other features and objects of this invention and the manner of attaining them will become more apparent and the invention itself will be best understood by reference to the following description of an embodiment of the invention taken in conjunction with the accompanying drawing, wherein:

FIG. 1 is a front vertical sectional detail view of the bait bucket incorporating the present invention and illustrating the relationship of the container and receptacle in elevated position supported by its supporting rack;

FIG. 2 is a side elevation of the bait bucket shown in FIG. 1 with the bail shown in dotted lines moving towards its retracted position, and the supporting legs in phantom to show their resiliency;

FIG. 3 is a top plan view of the bait bucket shown in FIG. 1, portions of the cover being broken away to illustrate details of construction;

FIG. 4 is a detail view of a portion of the structure of FIG. 2 showing the cover in a raised position on its hinged ring connector;

FIG. 5 is a side elevation of the bait bucket in collapsed nested position and with the bail retracted for storage;

FIG. 6 is a perspective view of the bail;

FIG. 7 is a perspective view of a form of bail attaching means in which integral loops are formed in a wire ring;

FIG. 8 is a top plan view of the bait receptacle supporting rack; and

FIG. 9 is a side elevation of the rack shown in FIG. 8.

Referring to the drawings, a form of bait bucket incorporating the present invention has been shown as comprising an outer impervious container 20, such as of metal or plastic, cylindrical in shape and having a bottom 21 and an open end defined by an outwardly extending arcuate flange or rim 22 at the upper end of its cylindrical side wall 24. A similarly shaped inner impervious receptacle 25, such as of metal or plastic, has its cylindrical side wall 26 flanged at 27 at its open upper end opposite the bottom 28 and is of a size to be freely received within container 20 in either of two positions relative thereto, rack means 30 being provided to locate receptacle 25 concentrically of container 20 in both such positions. Although shown as cylindrical, the inner and outer containers may be of any desired shape.

The rack 30 shown in FIGS. 8 and 9 may be fabricated of wire and include a ring portion 32 engageable with the exterior surface of receptacle 25 adjacent the rim 27 thereof and a plurality of leg members 34 equally spaced circumferentially of the ring 32. Each leg 34 has a major portion 35 extending downwardly and outwardly from the ring 32, and an inwardly extending portion 37 terminating in a generally vertical foot 38. As particularly shown in FIG. 1, the rack 30 serves to hold the receptacle 25 in an elevated position, in which case the leg portions 37 engage the inner surface of container rim 22 at spaced points therearound as in FIG. 3. The feet 38 engage the inner surface of wall 24 to locate the rack 30 and thus the receptacle 25 concentrically of container 20. Legs 34 are capable of being flexed inwardly due to their resiliency, as shown in phantom in FIG. 2, in which position the legs and receptacle 25 may be lowered into container 20 to the position shown in FIG. 5.

Surrounding receptacle 25 is a generally cylindrical wick member 40 of felt or other absorbent fabric material, having its upper end 41 attached adjacent rim 27 and may be at least partly retained by ring 32. Wick 40 is of a length to depend well below the bottom 28 of receptacle 25 when in its elevated position as shown in FIG. 1.

Attached to the receptacle 25 by means of a hinge ring element 45, is a closure assembly 47 comprised of an inner perforated lid 48 and an outer imperforate cover 50 which may be spaced from lid 48 by means of a plurality of sleeve members 51 communicating with aligned openings in the lid 48 and cover 50 through which bolts 52 pass and are retained by nuts 53. Centrally of cover 50 may be a handle or knob 54 secured by a bolt and nut assembly 55. Lid 48 and receptacle 25 may be provided with holes 49 and 56, respectively, to receive the hinge ring 45. This hinge ring 45 may have overlapping ends 46 to facilitate attachment, and serve as a hinge about which the closure 47 may be loosely pivoted to gain access to the receptacle, its primary use however is to link the cover to the receptacle to prevent detachment and loss of the cover.

When the receptacle 25 is in its elevated position, the unit has a tendency toward being top heavy particularly when the liquid level is low, and might tip over during use if a conventional bail is used. To overcome this, the bail attaching ears are located to one side of the diametrical center line of the container 20 and may be formed at 57 and 58 from a wire ring 60 adapted to embrace the exterior surface or wall 24 of container 20 adjacent rim 22. The ears 57 and 58 are inclined from the vertical as shown in FIGS. 2, 5 and 7 and are adapted to receive the legs 61 of a U-shaped bail 62 which may have a handle 63 at the bight thereof. The free ends of the bail 62 are doubled back upon themselves at 65 and terminate in lateral tips 66 above the bends 65, which tips 66 serve as stops to engage the ears 57, 58. Due to the inclination of ears 57 and 58, the legs 61 of bail 62 extend vertically upwardly therefrom and tipping to the left or heavy side of the container 20, as viewed in FIG. 2, is prevented. Additionally the bail 62 provided herein is capable of being moved downwardly as shown in dotted lines in FIG. 2 and swung in an arc from vertical to a horizontal position and moved into a retracted position as shown in FIG. 5, with the bight of the bail adjacent the wall 24 of the container 20.

When the structure is in use, the bait is carried in the receptacle 25 and is kept in a cool condition by partly filling the container 20 with an evaporatable liquid such as water and positioning the receptacle in its raised position (FIG. 1). The depending portion of wick 40 being submerged in the water, absorbs such water and due to capillary action the entire wick becomes moist. Air circulating around the wick and receptacle evaporates the moisture from the wick and reduces the temperature in the receptacle to continue the capillary and cooling actions. Tests indicate that temperature in the receptacle 25 can be maintained up to 15° cooler than the outside temperature for comparatively long periods of time sufficient to keep the bait alive and in good condition for fishing. When worms or the like are used for bait, moist earth may also be placed in receptacle 25, while it may be partly filled with water when minnows or the like are used.

The closure assembly 47 not only prevents loss of bait by closing the open end of receptacle 25, but also serves to permit air to circulate therein through the apertures in lid 48 due to spacing of cover 50 which also serves to shade the contents of the receptacle from the sun.

While there is described above the principles of this invention in connection with specific apparatus, it is to be clearly understood that this description is made only by way of example and not as a limitation to the scope of this invention.

What is claimed is:
1. A bait carrier and conditioner comprising:
 (a) an open ended container for a supply of water,
 (b) an impervious receptacle for bait telescopically arranged in said container, said receptacle having a rim,
 (c) collapsible rack means engageable with said rim to selectively position said receptacle in either of two positions in and substantially above said container, and
 (d) a cylindrical wick embracing said receptacle and having a depending portion disposed in the water in said container when said receptacle is in said above position, said wick being moistened by capillary action and said receptacle cooled by evaporation of such moisture.

2. An apparatus according to claim 1 including a bail connected to said container, and including means for preventing the tipping of said apparatus when lifted by said bail and said receptacle is in said above position.

3. An apparatus according to claim 1 wherein said means to position said receptacle comprises a plurality of resilient legs extending downwardly and outwardly from said rim of said receptacle, the outer ends of which legs are releasably engageable with the upper edge of said container.

4. A bait container comprising:
 (a) an outer container for a supply of water and having a flanged open end,
 (b) an impervious receptacle for bait removably disposed within said container, said receptacle having a rim,
 (c) rack means engageable with said rim for spacing said receptacle within said container and for positioning said receptacle so that a major portion projects above said container,
 (d) a wick embracing said receptacle and having a depending portion terminating adjacent the bottom of said container when said receptacle is above said container, and
 (e) a cover for said receptacle having a perforated plate for closing said receptacle and a spaced imperforate plate for shielding said perforated plate.

5. A portable double receptacle comprising:
 (1) an outer open ended container for a supply of evaporatable liquid,
 (2) an inner open ended impervious container telescopically positioned in said outer container,
 (3) resilient means engageable with the open end of said inner container to selectively position said inner container so that its bottom surface is adjacent either the bottom or the open end of said outer container, and
 (4) bail means for preventing the tilting of said receptacle relative to said bail while being carried by said bail, said bail means comprising:
  (a) loops attached to opposite sides of said receptacle offset horizontally from the center of gravity of said receptacle to urge rotation against said loops in one direction when the receptacle is lifted by said bail, the ends of said bail extending through said loops, said loops being in the same plane and at an angle to the horizontal, and
  (b) stop means projecting from and adjacent the ends of said bail for engaging said loops for preventing said rotation of said receptacle about the horizontal axis through said loops.

6. A portable receptacle including means for keeping the interior thereof cool, comprising:
 (a) an outer container having side walls and an open upper side,
 (b) an inner impervious container spaced from the side walls of said outer container, said inner container having a rim,
 (c) flexible rack means engageable with said rim for positioning said inner container coaxial of said outer container and supporting said inner container substantially above the open upper side of said outer container, and
 (d) wick means surrounding the side walls of said inner container in said space between said containers and extending from the bottom of said inner container to the bottom of said outer container, when said inner container is supported by said supporting means,
whereby an evaporatable liquid may be placed in said outer container to maintain said wick means wet which is exposed to the atmosphere above said outer container and the latent heat of evaporation of said liquid from said wick means maintains said inner container cool.

7. A portable receptacle according to claim 6 including a bail attached to said outer container.

8. A portable receptacle according to claim 7 including means for preventing the tipping of said receptacle when carried by said bail.

9. A portable receptacle according to claim 8 wherein said tip preventing means includes loops attached to said outer container near tis upper end for attaching said bail, said loops being offset horizontally from the center of gravity of said receptacle, and stop means on said bail to engage said loops to limit the rotation of said receptacle relative to said bail.

10. A portable receptacle according to claim 6 including a cover for said inner container.

11. A portable receptacle according to claim 10 wherein said cover comprises spaced upper and lower plates, said lower plate having ventilation apertures therein.

12. A portable receptacle according to claim 10 including means for loosely attaching said cover to said inner container.

References Cited by the Examiner

UNITED STATES PATENTS

| | | | |
|---|---|---|---|
| 82,817 | 10/1868 | Fenn | 220—17 |
| 203,541 | 5/1878 | Henkel | 220—96 |
| 335,157 | 2/1886 | Streator | 62—316 |
| 506,302 | 10/1893 | Bowers | 220—96 |
| 521,244 | 6/1894 | Muncaster | 43—56 |
| 540,004 | 5/1895 | Rudy | 220—96 |
| 1,158,757 | 11/1915 | Welsch | 62—316 |
| 1,935,424 | 11/1933 | Wichmann | 62—91 |
| 2,182,160 | 12/1939 | Nelson | 43—56 |
| 2,309,534 | 1/1943 | Powell | 43—56 |
| 2,775,872 | 1/1957 | Bell | 62—457 |

SAMUEL KOREN, *Primary Examiner.*

ABRAHAM G. STONE, *Examiner.*